US009706466B2

(12) United States Patent
Zhang

(10) Patent No.: US 9,706,466 B2
(45) Date of Patent: Jul. 11, 2017

(54) PEER-TO-PEER TRAFFIC LOCALIZATION

(71) Applicant: Telefonaktiebolaget L M Ericsson (publ), Stockholm (SE)

(72) Inventor: Shunliang Zhang, Beijing (CN)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 206 days.

(21) Appl. No.: 14/402,271

(22) PCT Filed: May 21, 2013

(86) PCT No.: PCT/SE2013/050577
§ 371 (c)(1),
(2) Date: Nov. 19, 2014

(87) PCT Pub. No.: WO2013/176610
PCT Pub. Date: Nov. 28, 2013

(65) Prior Publication Data
US 2015/0139185 A1 May 21, 2015

(30) Foreign Application Priority Data
May 24, 2012 (WO) ............... PCT/CN2012/075985

(51) Int. Cl.
*H04W 36/24* (2009.01)
*H04W 8/08* (2009.01)
(Continued)

(52) U.S. Cl.
CPC ............. *H04W 36/24* (2013.01); *H04L 45/00* (2013.01); *H04L 67/1061* (2013.01);
(Continued)

(58) Field of Classification Search
CPC ........................ H04W 36/24; H04L 67/1061
(Continued)

(56) References Cited

U.S. PATENT DOCUMENTS 8,385,199 B1 * 2/2013 Coward ............... H04W 28/02
370/230.1
2007/0232301 A1 * 10/2007 Kueh ................... H04W 8/082
455/433
(Continued)

FOREIGN PATENT DOCUMENTS

WO 2011085973 A1 7/2011

OTHER PUBLICATIONS

Hitachi (Load Re-balancing between GWs), Jan. 18-22, 2010.*
(Continued)

*Primary Examiner* — Jae Y Lee
*Assistant Examiner* — Jean F Voltaire
(74) *Attorney, Agent, or Firm* — Patents on Demand P.A.; Brian K. Buchheit; Scott M. Garrett

(57) ABSTRACT

The present invention relates to a method for localization of peer-to-peer packet data traffic in a mobile network comprising a core network and at least one radio access network (RAN). The method comprises obtaining data traffic information for a packet data connection between two peers located in the RAN and where the connection is passing through a packet gateway node P-GW in the core network. If it is determined that the packet data connection is carrying peer-to-peer traffic, the PG-W requests localization policy information from a policy control function entity PCRF. The PCRF returns localization policy information related to the two peers and if localization is permitted, the P-GW requests a mobile management function entity to move the data traffic from the existing packet data connection to another packet data connection passing through another (local) packet gateway node L-GW which could be located in the same RAN as the peers.

20 Claims, 9 Drawing Sheets

(51) Int. Cl.
*H04L 12/701* (2013.01)
*H04W 36/28* (2009.01)
*H04W 36/14* (2009.01)
*H04W 36/00* (2009.01)
*H04W 36/08* (2009.01)
*H04L 29/08* (2006.01)
*H04W 80/04* (2009.01)
*H04W 8/14* (2009.01)

(52) U.S. Cl.
CPC ......... *H04W 8/082* (2013.01); *H04W 36/005* (2013.01); *H04W 36/08* (2013.01); *H04W 36/14* (2013.01); *H04W 36/28* (2013.01); *H04W 8/14* (2013.01); *H04W 36/0027* (2013.01); *H04W 80/04* (2013.01)

(58) Field of Classification Search
USPC .................................................. 370/328–331
See application file for complete search history.

(56) References Cited

U.S. PATENT DOCUMENTS

2010/0208698 A1* 8/2010 Lu .................... H04W 36/0027
370/331
2012/0166618 A1* 6/2012 Dahod .................... H04L 47/20
709/224
2012/0327893 A1* 12/2012 Yuan ..................... H04W 24/10
370/329

OTHER PUBLICATIONS

Hitachi (Load Re-balancing between GWs), dated Jan. 18-22, 2010.*

Hitachi et al., "Load Re-balancing between GWs," Jan. 18-22, 2010, 2 pages, 3GPP TSG SA WG2 Meeting #77, TD S2-10xxxx, Shenzhen, China.

TSG SA WGI, "WID on Proposal for a study on Proximity-based Services," Sep. 19-21, 2011, 5 pages, 3GPP TSG SA Plenary Meeting #53, SP-110590, Fukuoka, Japan.

Panasonic, "Consider offloading factor in peer selection," Oct. 10-14, 2011, 4 pages, 3GPP TSG SA WG2 Meeting #87, TD S2-114420, Jeju, Korea.

China Unicom, "Introduction of eNB-to-eNB direct transmission for proximity service provision," Mar. 26-30, 2012, 3 pages, 3GPP TSG RAN WG3 #75bis meeting, R3-120571, San Jose del Cabo, Mexico.

International Search Report and Written Opinion, Application No. PCT/SE2013/050577, dated Sep. 11, 2013, 10 pages.

* cited by examiner

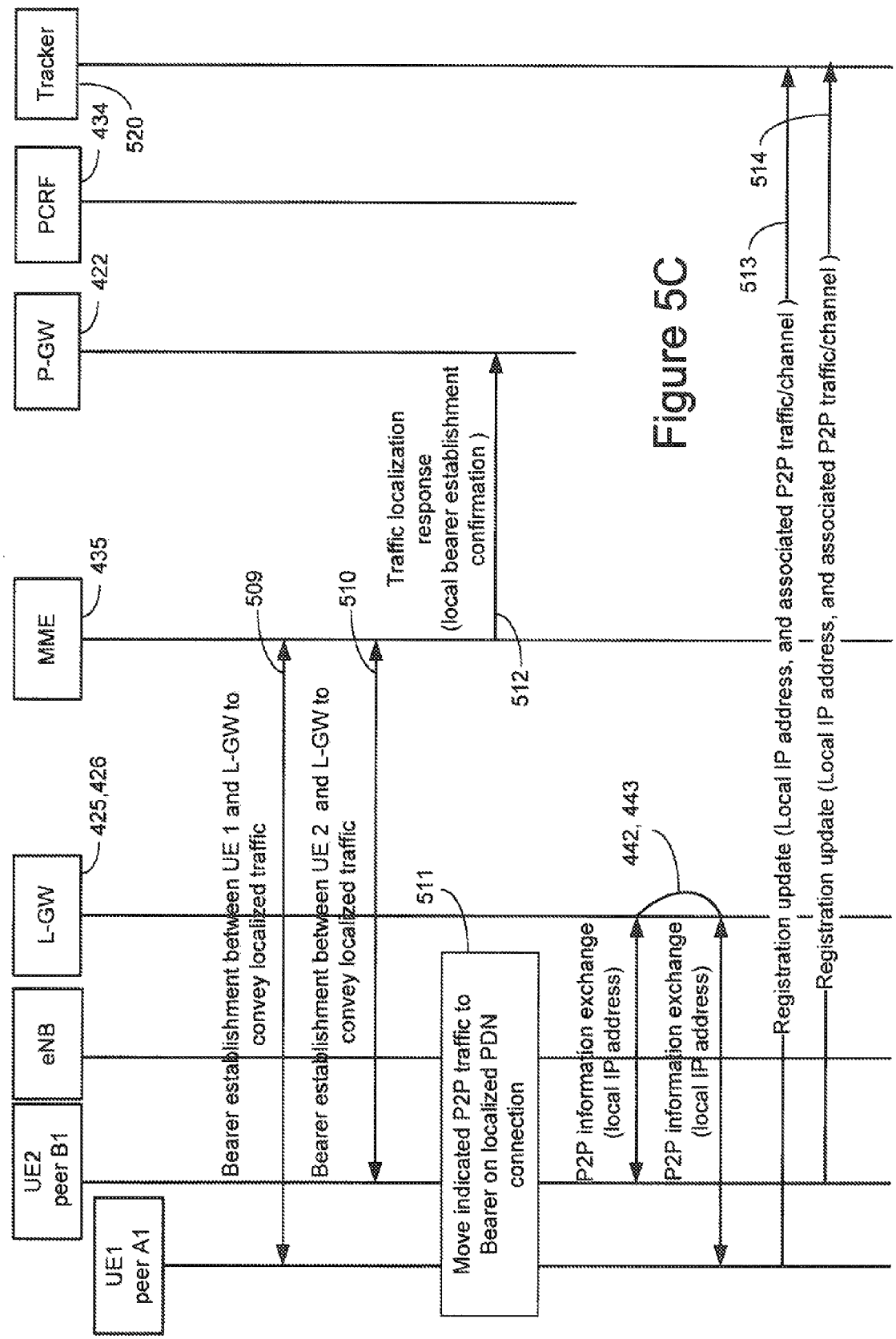

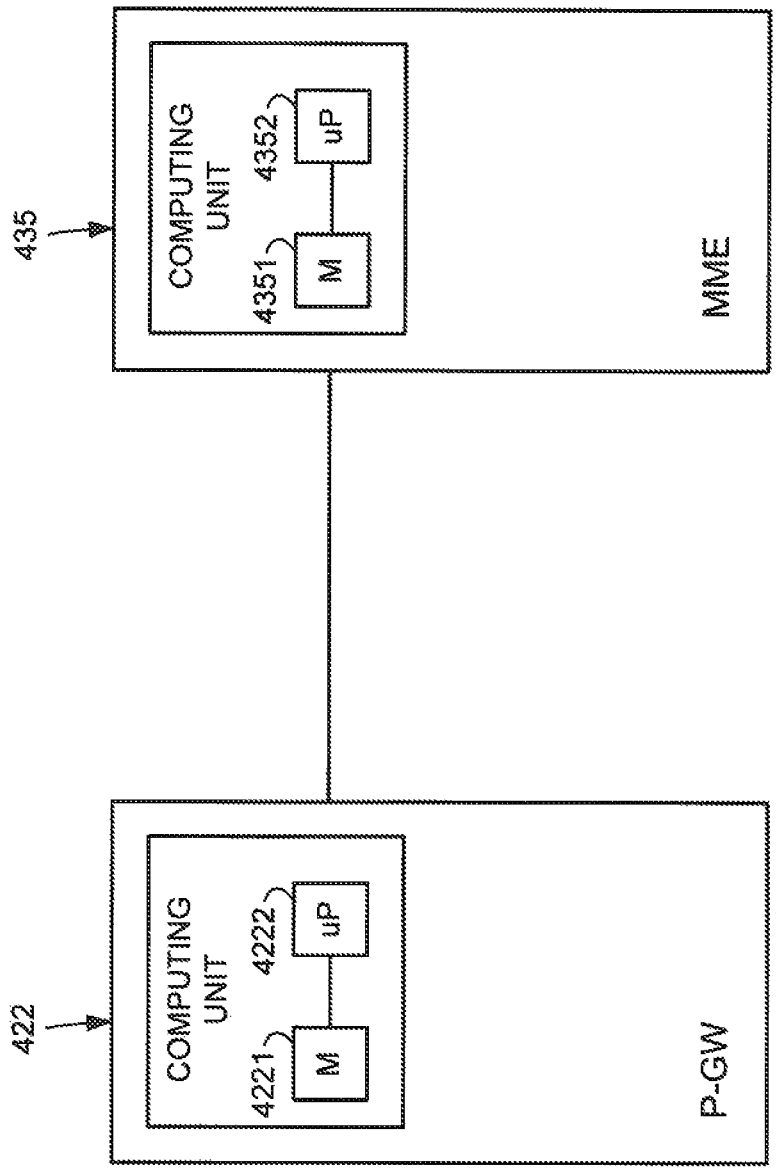

PEER-TO-PEER TRAFFIC LOCALIZATION

CROSS-REFERENCE TO RELATED APPLICATIONS

This application is a National stage of International Application No. PCT/SE2013/050577 filed May 21, 2013, which claims priority to International Application No. PCT/CN2012/075985 filed May 24, 2012, which are hereby incorporated by reference.

TECHNICAL FIELD

The present invention relates to a method and a node for localization of peer-to-peer packet data traffic in a mobile network.

BACKGROUND

Due to the quick growth of smart phone penetration, data traffic in mobile networks is experiencing an explosive growth. Among all mobile data traffic, video streaming is one important part. Along this trend, several streaming delivery methods have being deployed. Among all methods, Content Delivery Networks, CDN and Peer-to-peer, P2P are two important approaches to deliver streaming content over networks. Recently, some P2P based live streaming systems have being quite successful in context of fixed access networks. P2P streaming system is quite scalable by making use of uplink contribution from large amount of peers. Due to the advantage of P2P systems, several CDN players start introducing P2P into their CDN system.

On the other hand, existing P2P streaming systems are facing some problems in the context of mobile networks. For example, it is possible that one or more mobile peers involved in a P2P streaming application are located in the same area, such same cell/Base Station, BS or same Radio Access Network, RAN. While, according to current mobile network principles, a packet gateway node such as a P-GW/GGSN is the only IP anchor point for all user equipment, UEs served by it, and all IP traffic from/to UEs should be routed through the P-GW/GGSN. Therefore, the problem like triangle routing of mobile IPv4 would happen. The problem is more serious in case a large number of mobile peers are involved in streaming applications.

The problems are illustrated by three scenarios in FIGS. 1 to 3.

Summarizing these scenarios, in FIG. 1 a mobile peer A located in a radio access network (111) involved in a P2P application may fetch a chunk of streaming content 132 from a server 131 in a content distribution network, CDN 130 and another chunk of data of the same streaming from another mobile peer B located in the same cell. Meanwhile, peer A may also fetch a different chunk of data of the same streaming from peer C located at a different base station but the same packet gateway node, S-GW (121) as in FIG. 2. Meanwhile, it may also fetch some chunks from peer D located at a different base station, a different S-GW (123) but the same packet gateway node, P-GW (122). In existing mobile networks, typically all IP traffic from/to a UE should be forwarded to P-GW (122), where IP traffic is routed to different destinations.

So, obviously, certain backhaul transport resources and core network element resources would be wasted in case a lot of IP traffic is exchanged between mobile peers local in same area. One problem is how to localize related P2P traffic. Another problem is how to enforce such traffic localization (P2P traffic turning). Another problem is how to recognize the right traffic for localization and which node to make decision for traffic localization. Yet another problem is to select factors that should be taken into account when deciding that certain traffic between certain peers should be localized or not. For example, due to some special requirements related to national security (as lawful interception) or charging considerations from operators, it is not permitted to enforce such traffic localization for certain UEs and certain traffic. While for other UEs and traffic it is possible. Another example, it is possible that certain UEs located in certain areas are not permitted for traffic localization. In addition, it is possible that traffic localization between certain peers is only expected due to some dynamic reasons, for example, the load in core network or backhaul transport network is about to be overloaded.

P2P traffic localization has been discussed both in the academic world and within industry and can basically be categorized into two types:

Type 1: Peer-driven biased neighbour selection for traffic localization.

The general idea of this approach is that, a specific peer performs optimized neighbour selection locally by various metrics, such as: latency based topology maps, Autonomous System, AS mapping and other related metrics locality-aware neighbour selection.

Type 2: ISP-driven biased neighbour selection for traffic localization.

The general thinking of this approach is that the ISP provides an underlay network info by some network elements to P2P application system for optimized peer selection. For example one or more trackers could be introduced by an operator to facilitate P2P system for more reasonable peer selection. Two important methods in this direction are: P4P framework and ALTO. Both of them are under development in different IETF working groups.

However, these prior art focus on ISP and fixed network level traffic localization. None of them has paid attention to traffic localization for mobile networks.

SUMMARY

With this background, it is the objective to obviate at least some of the problems mentioned above.

This objective is achieved by:

Firstly a method and a modified packet gateway node (such as a P-GW) that is configured to obtain data traffic information for an existing packet data connection between a first peer and a second peer passing through the packet gateway node determine that the existing packet data connection is carrying peer-to-peer traffic request for localization policy information from a policy control function entity (such as an PCRF) wherein the request comprises the obtained data traffic information and additional information such as location information about the first and the second peer receive from the policy control function entity the requested localization policy information and to request a mobile management function entity (such as an MME) to move the data traffic from the existing packet data connection to another packet data connection passing through another packet gateway node (such as a local gateway, L-GW) if the localization policy information received from the policy control function entity so permits.

Secondly a method and a mobile management function entity (such as an MME) that is configured to receive from the packet gateway node (such as the P-GW described above) the request to move the data traffic from the existing packet data connection (between the first peer and a second peer) to another second packet data connection passing through the second packet gateway node.

based on location information received in the request, select another packet gateway node instruct the related UEs/peers to establish the other packet data connection between the first peer and the second peer through the selected second packet gateway node.

This solution has at least the following advantages:

1. It makes it possible to localize peer to peer applications between local mobile UEs in a dynamic and flexible way by taking into account various dynamic info and policy from operators.
2. With the solution, backhaul transport resources and core network resources consumed by P2P traffic can be reduced significantly in case P2P streaming applications and the number of mobile peers is high.
3. The solution brings no or little impact to the installed base of RAN products such as base stations.

The invention will now be described in more detail and with preferred embodiments and referring to accompanying drawings.

BRIEF DESCRIPTION OF THE DRAWING

FIGS. 5A, 5B and 5C are message flow charts corresponding to the embodiments in FIGS. 4A and 4B.

FIGS. 6A and 6B are block diagrams showing embodiments of an improved packet gateway node and an improved mobile management function entity for traffic localization.

DETAILED DESCRIPTION

Figure 1:
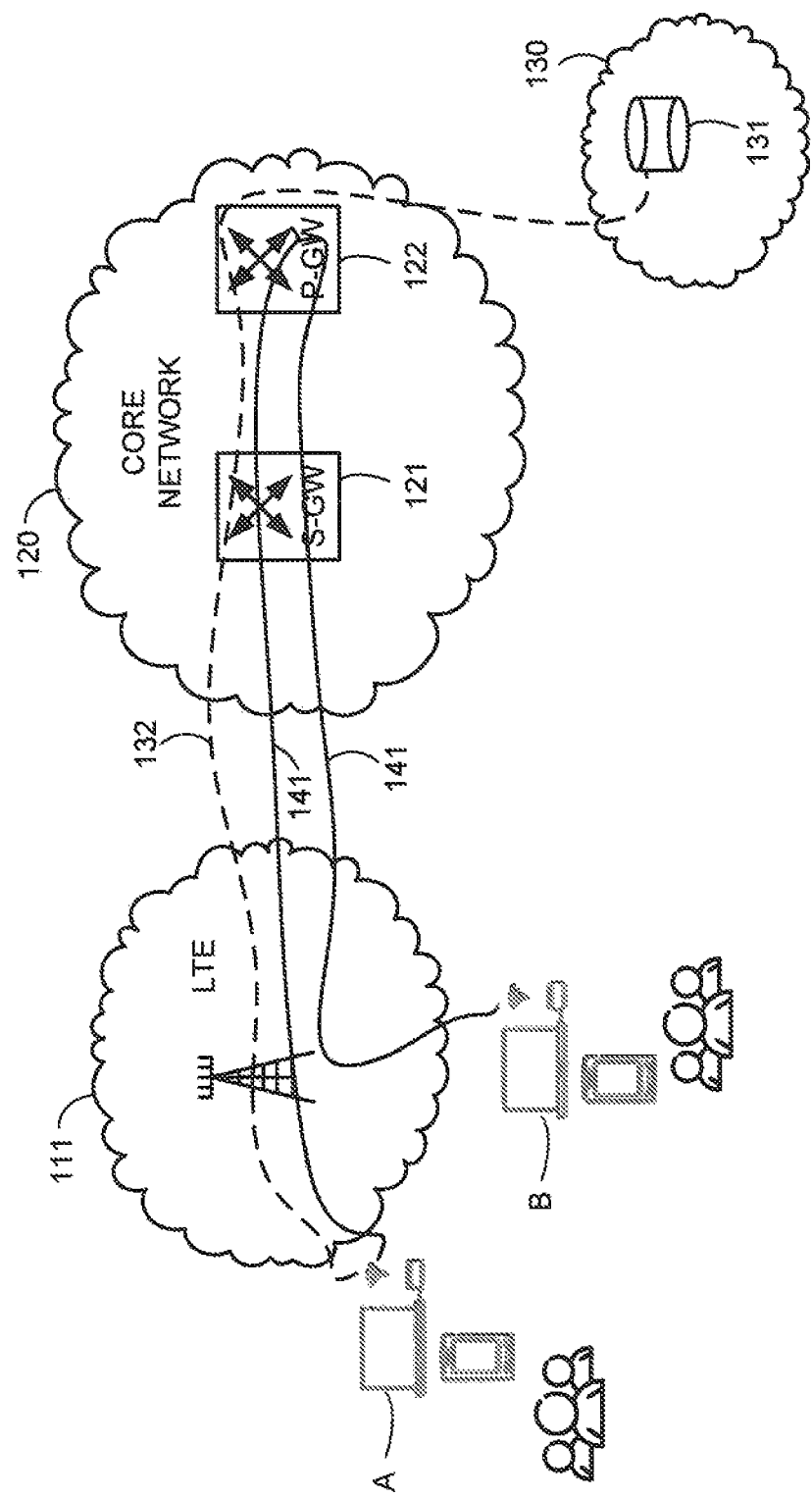
FIGS. 1, 2 and 3 are block diagrams showing existing P2P streaming systems.
Figure 2:
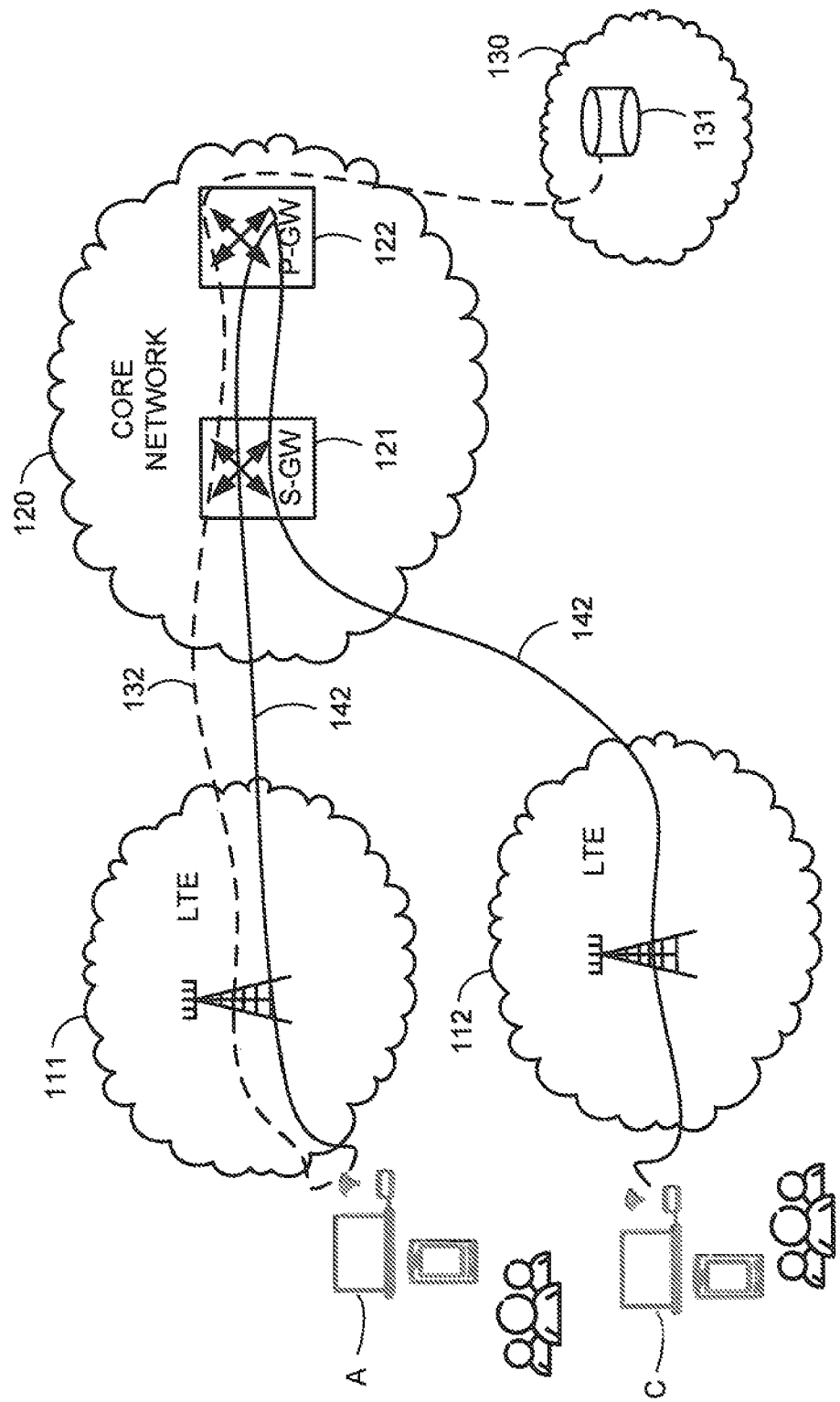
Figure 3:
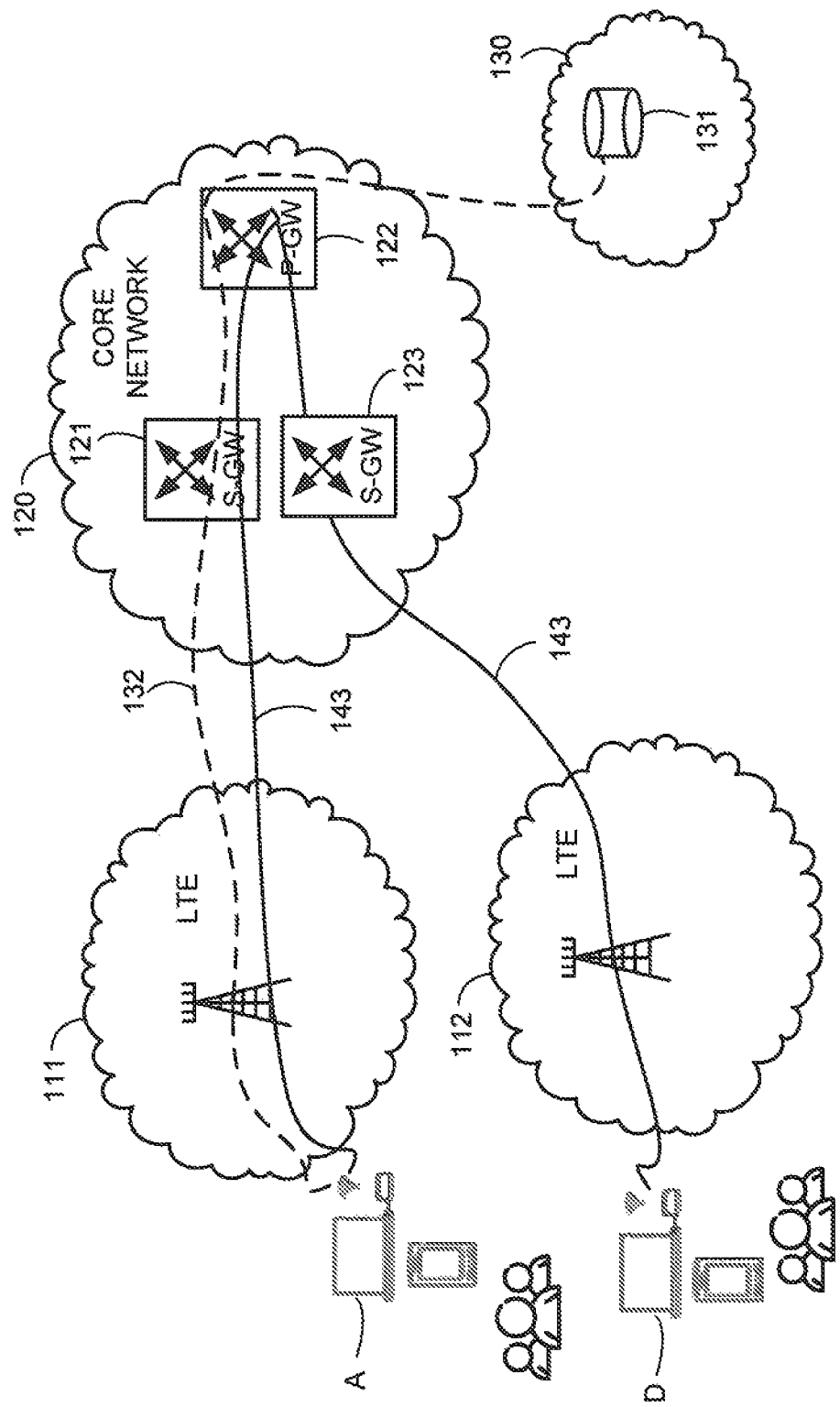
Figure 4A:
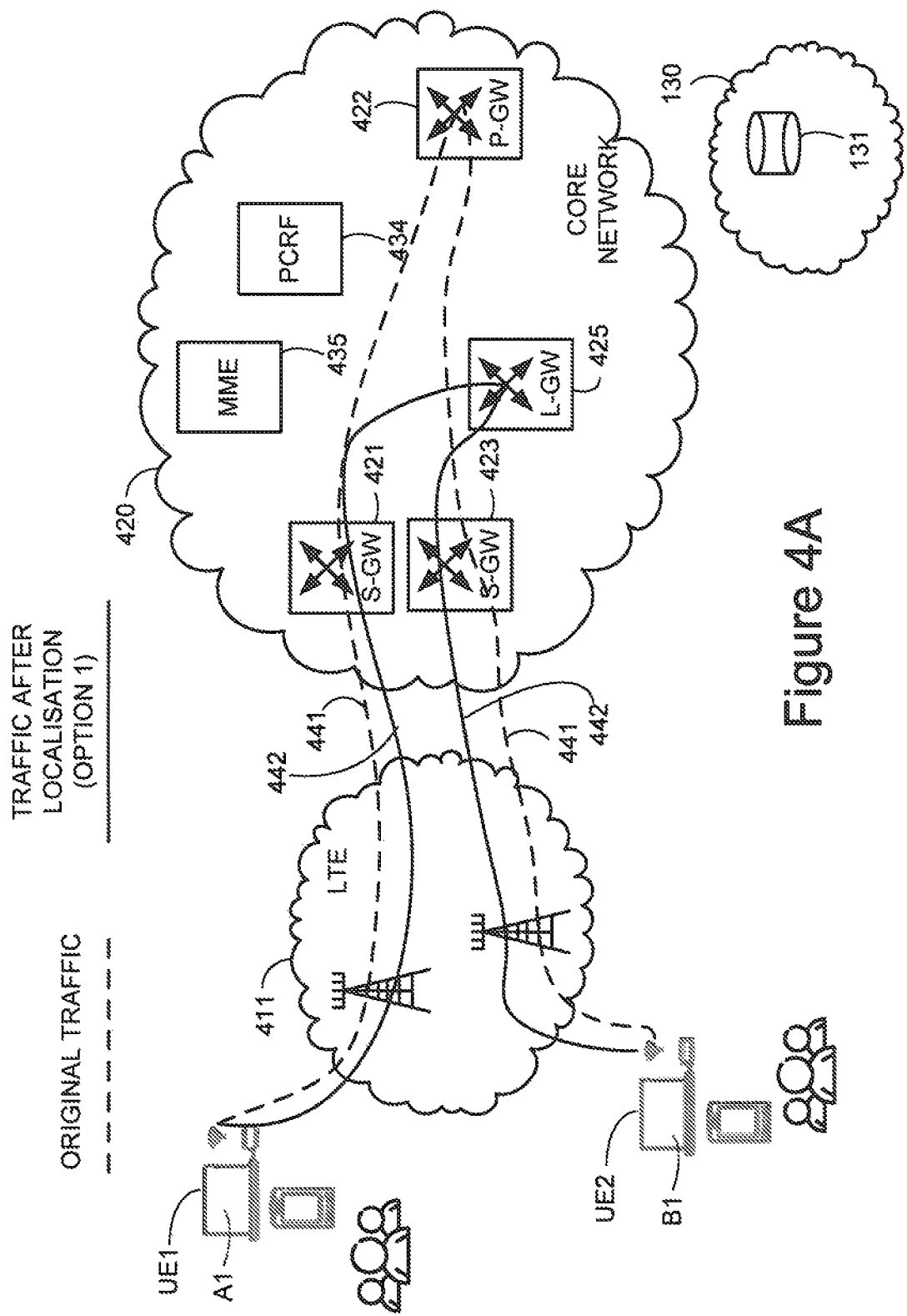
FIGS. 4A and 4B are block diagrams showing two embodiments of improved traffic localization in a mobile network.
Figure 4B:
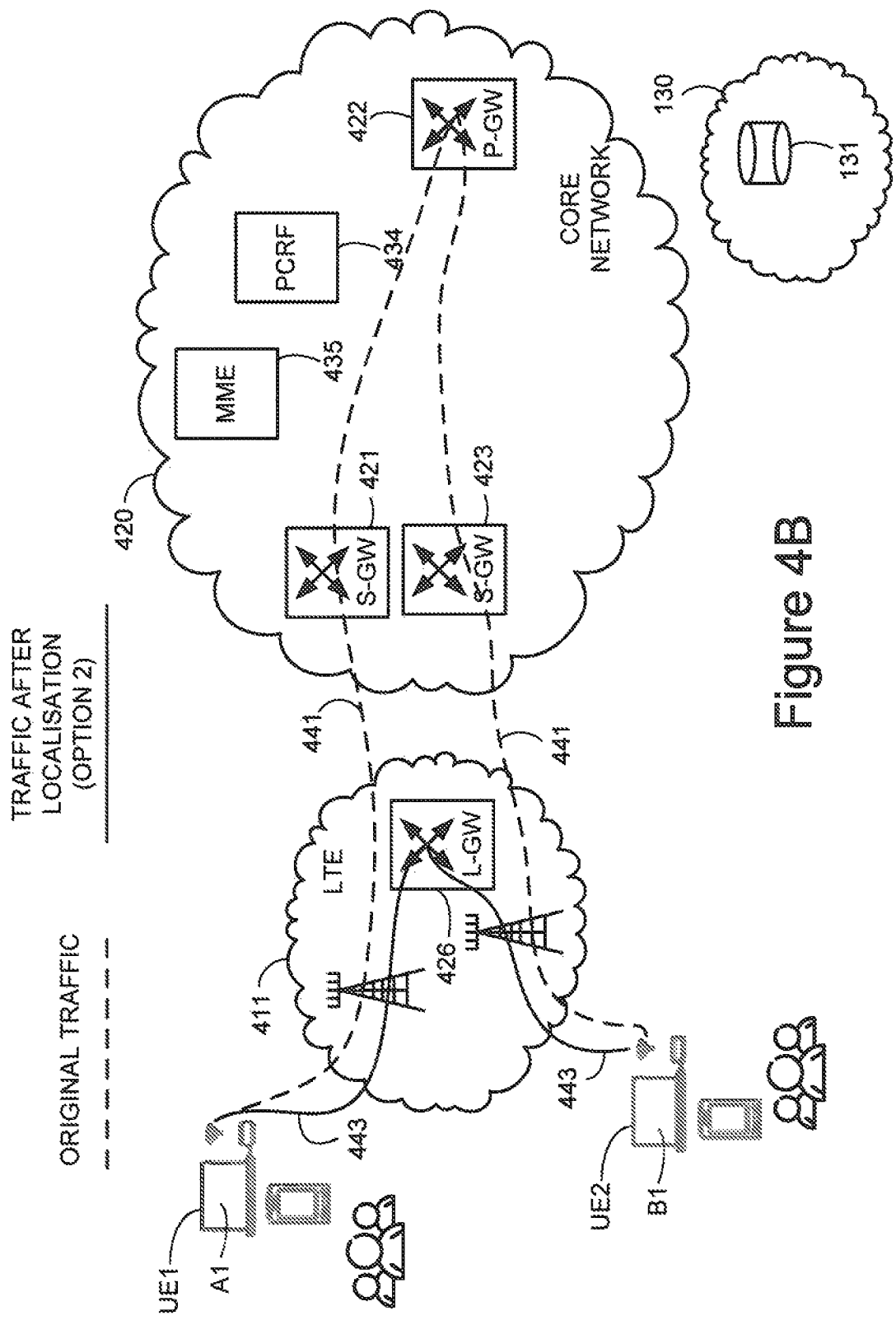

FIGS. 4A and 4B illustrate two embodiments of improved traffic localization of P2P traffic in a mobile network comprising a core network 420 and at least one radio access network (here a LTE RAN 411). FIG. 4A illustrates the embodiment where the traffic localization is done in the core network 420 and FIG. 4B illustrates the embodiment where the traffic localization is done in the radio access network 411.

1. Upon identified P2P traffic in a packet data connection 441 between two mobile peers A1 and B1, the packet gateway node P-GW 422 asks for traffic localization policy from a policy control node or function, PCRF 434 by reporting detected P2P traffic info (such as traffic content or channel ID/application ID info, P2P application name), and related peer info (location info, mobility info, UE ID) for peers A1 an B1, as well as core network related load status information and/or backhaul link load status information.
2. The PCRF 434 generates a traffic localization policy regarding the related peers A1,B1. In case of a roaming UE situation, the negotiation between a visited policy control node or function vPCRF and a home policy control node or function hPCRF may be performed to determine the traffic localization policy between two peers A1,B1. During the process, subscription information for the UE1,UE2, detected P2P traffic information reported from the P-GW 422, a local packet gateway node L-GW topology, charging or security requirements for UE1,UE2 as well as another operator's strategy are taken into account.
3. The PCRF 434 replies to the P-GW 422 with specific traffic localization policy, which may include following information whether localization is permitted or not, associated condition (such as time or core network CN load status), where to localize related traffic (at RAN or CN level), and description information about traffic/applications subject to the localization policy.
4. According to the policy from the PCRF 434, in case the traffic localization between related peers A1,B1 is permitted, the P-GW 422 initiates a traffic localization process by sending a message to a mobile management function/node MME 435, wherein the message includes traffic localization level (RAN or CN), related traffic description/or specific UL and DL TFT to identify related IP traffic, ID of involved UE1 and UE2.
5. The MME 435 is enhanced to select a common local gateway, L-GW for the involved UE1 and UE2 based on the traffic localization level indication provided from the P-GW 422. In FIG. 4A the traffic localization level indication is set to Core Network, CN (and L-GW 425 is selected) and in FIG. 4B the traffic localization level indication is set to Radio Access Network, RAN (and L-GW 426 is selected).
6. The MME 435 may initiate a network based packet data connection setup process to each of the UE1 and UE2 by a NAS message which may indicate a cause for the additional packet data connection, such as traffic localization and service/application/traffic to be localized through the local packet data connection. During the process, the L-GW (LG-W 425 or L-GW 426) may allocate a new local IP address, which can be used by the mobile peer to exchange related P2P traffic/application with other mobile peers by local packet data connection. In addition, the IP address can be used by the L-GW 425,426 to route IP traffic between UE1 and UE2 locally.
7. On the local packet data connection, the MME 435 initiates a local bearer establishment process between the selected L-GW 425,426 and UE1 and UE2, and moves related P2P applications/traffic to the local bearer 442, 443 by providing a specific UL TFT to related UE. Besides, DL TFT associated with the bearer 442,443 may be provided to the L-GW 425,426 for DL traffic mapping.
8. The mobile peer A1, B1 may advertise its local IP address info associated with related P2P application/content permitted for localization to a tracker of the specific P2P application, as well as to other peers involved in the same application. Other neighbour mobile peers with similar local IP address may communicate directly with the mobile peer through local packet data connections.

Figure 5A:
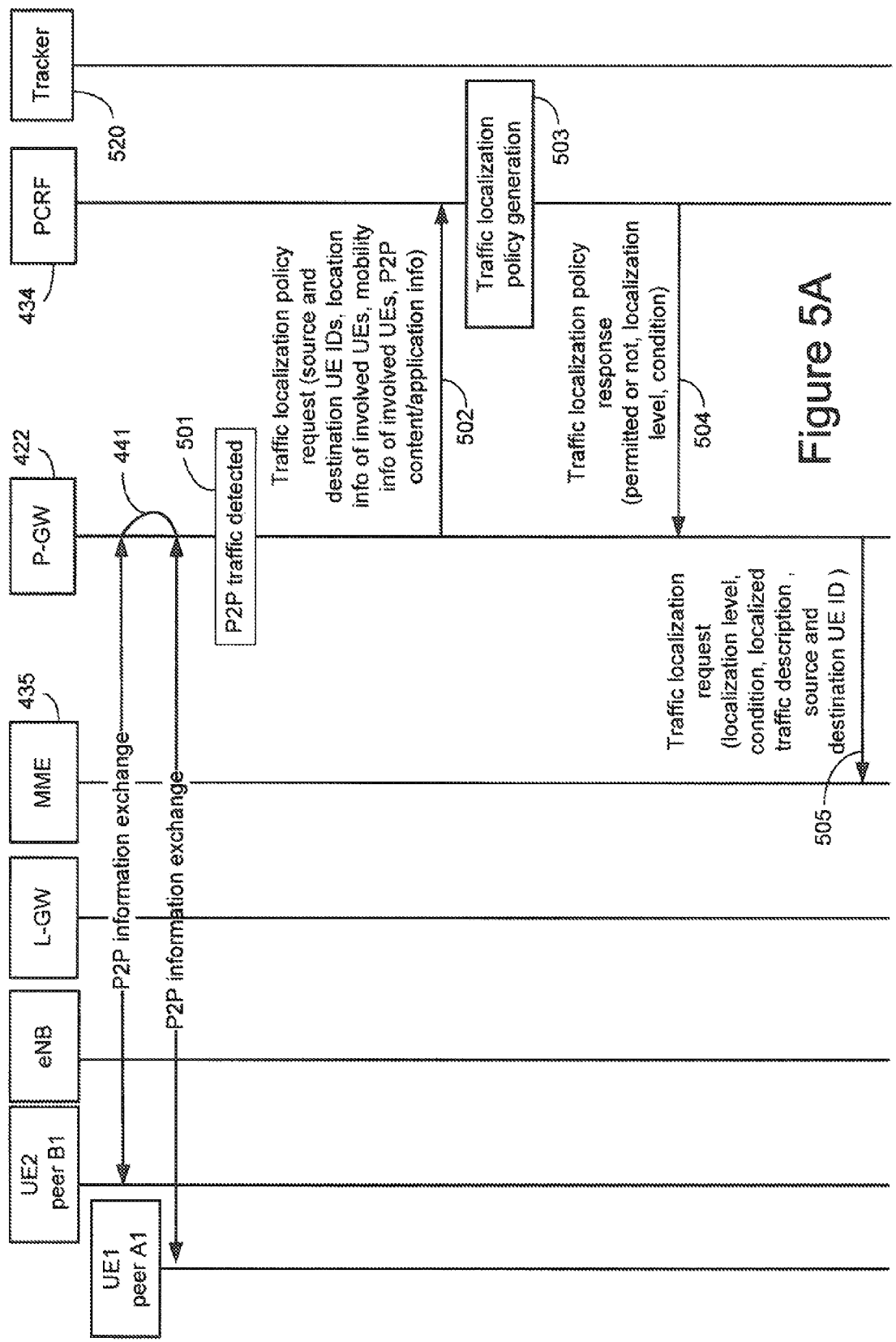
Figure 5B:
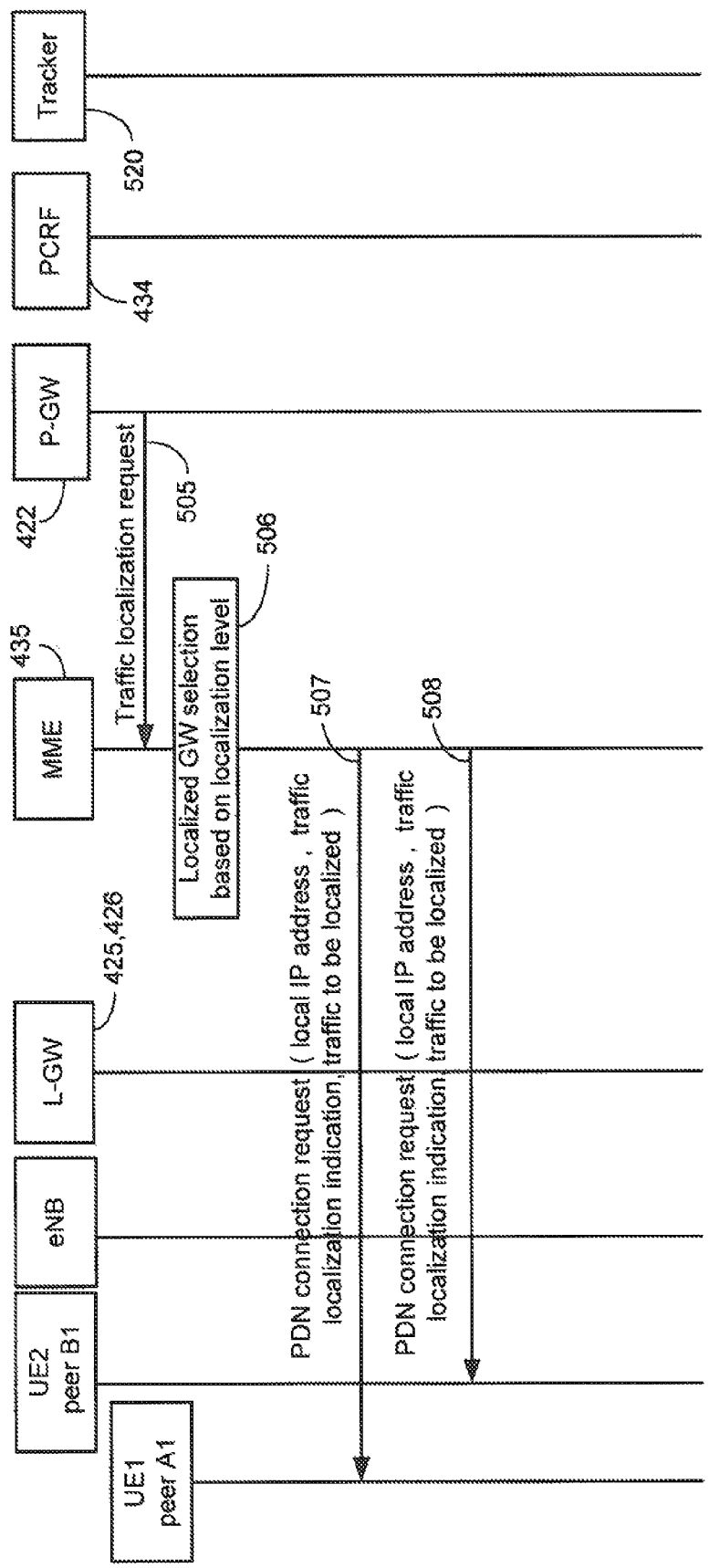

FIGS. 5A, 5B and 5C are message flow charts corresponding to the embodiments in FIGS. 4A and 4B.

Through the bearer 441 established between UE1 and UE2, two mobile peers A1, B1 exchange P2P traffic through a P-GW or a GGSN 422. The P-GW/GGSN 422 analyses in step 501 if there is some P2P application traffic between UE1 and UE2 based on deep packet inspection DPI functions.

If in step 501, P2P application traffic is detected between the two local mobile peers A1, B1, the P-GW/GGSN 422 sends in step 502 a request message to the PCRF 434 to get traffic localization policy between the related peers A1,B1. The message to the PCRF 434 may include the following info: detected P2P traffic info (such as traffic content or channel ID info, P2P application name), related peers info (location info, mobility info, UE ID), as well as core network related load status info and/or backhaul link load status info.

Upon receiving the request message from the P-GW/ GGSN 422, the PCRF 434 generates in step 503 traffic localization policy between the peers A1,B1 by taking into account the reported info, as well as subscription info of related UEs and L-GW topology info. The generated traffic localization policy may include: whether localization is permitted, associated condition (such as time or Core Network, CN load status), where to localize related traffic (at RAN or CN level), and description info about traffic/ applications or UL TFT and DL TFT subject to localize policy.

The PCRF 434 provides the related traffic localization policy to the P-GW/GGSN 422 by a response message in step 504.

Based on the policy info from the PCRF 434, the P-GW 422 initiates a traffic localization process in case traffic localization should be enforced to the traffic between the two mobile peers A1, B1. More specifically, the P-GW 422 sends in step 505 a message to the MME 435 (for example through a S-GW 421,423 in FIG. 4A or 4B) the message including traffic localization level (RAN or CN), related P2P traffic description, ID of UE1 and UE2.

The MME 435 selects in step 506 a common L-GW for the involved UEs based on the traffic localization level. For example, in case the traffic localization level is RAN, then a common L-GW 426 located in or above RAN 411 is selected for the involved UEs; in case traffic localization level is CN, then a common L-GW 425 located in the core network 420 is selected for the involved UEs.

If necessary, the MME 435 may initiate a network based packet data connection setup process to each UE in question by a NAS message to the UE as in step 507 and 508. The message may indicate a cause for such additional packet data connection such as traffic localization, and service/ application/traffic to be localized through the local packet data connection. In addition, the L-GW 425, 426 may allocate a new local IP address to the UE, which can be used by the mobile peer to exchange related P2P traffic/application with other mobile peers by local packet data connection.

On the local packet data connection, the MME 435 initiates in steps 509 and 510 a bearer establishment process between the selected L-GW 425, 426 and each UE1,UE2 and the related P2P application/traffic is moved in step 511 to the local bearer 442,443 by providing a specific UL TFT to the related UE. Besides, DL TFT associated with the bearer is provided to the L-GW 425, 426 for traffic mapping. The MME 435 further sends a traffic localization response back to the P-GW 422 in step 512.

Through the new established bearer 442,443 between UE1 and UE2 and the common L-GW 425,426 the two peers A1, B1 can exchange the specific P2P application traffic through the L-GW 425,426.

Meanwhile, the mobile peers A1, B1 may in steps 513 and 514 advertise their local IP address information associated with the related P2P application/content permitted for localization to the tracker 520 of the P2P system, as well as to other peers. Other neighbour mobile peers with similar local IP address may communicate directly on local packet data connections.

FIGS. 6A and 6B are block diagrams illustrating embodiments of the improved packet gateway node, P-GW 422 and the improved mobile management function entity, MME 435.

The P-GW 422 comprises a processor 4222 coupled to a non-transitory memory 4221 storing computer program instructions wherein when the processor 4222 executes the instructions, the P-GW 422 is caused to perform the method steps described above for the P-GW 422. Similarly, the MME 435 comprises a processor 4352 coupled to a non-transitory memory 4351 storing computer program instructions wherein when the processor 4352 executes the instructions, the MME 435 is caused to perform the corresponding method steps described above for the MME 435.

ABBREVIATIONS

ALTO Application-Layer Traffic Optimization
APN Access Point Name
BS Base Station
CDN Content Delivery Network
CN Core Network
DL TFT DownLink Traffic Flow Template
DPI Deep Packet Inspection
GGSN Gateway GPRS Support Node
GPRS General Packet Radio Services
hPCRF Home PCRF
IETF Internet Engineering Task Force
IP Internet Protocol
IP-v4 IP version 4
ISP Internet Service Provider
L-GW Local GateWay
LTE Long Term Evolution
MME Mobility Management Entity
NAS Non-access Stratum
PDN Public Data Network
P2P Peer-to-peer
P4P Proactive Provider Assistance for P2P
PCRF Policy and Charging Rules Function
P-GW PDN Gateway
RAN Radio Access Network
S-GW Serving Gateway
UE User Equipment
UL Uplink
UL TFT UpLink Traffic Flow Template
vPCRF Visited PCRF

The invention claimed is:

1. A method for operating a first packet gateway node in a core network the method comprising:
   obtaining data traffic information for a first packet data connection between a first peer and a second peer each located in a radio access network where the first packet data connection is passing through the first packet gateway node;
   if determined from the data traffic information that the first packet data connection is carrying peer-to-peer traffic, sending a request for localization policy information to a policy control function entity wherein the request comprises the obtained data traffic information and information about the first and the second peer;
   receiving from the policy control function entity the requested localization policy information; and
   if, according to the received localization policy information, traffic localization is permitted, sending a request to a mobile management function entity to move the data traffic from the first packet data connection to a second packet data connection passing through a second packet gateway node.

2. The method as in claim 1, wherein the obtained data traffic information comprises any or a combination of:
   traffic content;
   channel ID;
   application ID information; and
   peer-to-peer application name.

3. The method as in claim 1, wherein obtaining the data traffic information is performed by deep packet inspection, DPI.

4. The method as in claim 1, wherein the information about the first and the second peer comprises any or a combination of:
   location information for the peers,
   mobility information for the peers, and
   user equipment identity.

5. The method as in claim 1, wherein the request for localization policy information further comprises information about a core network element load status or a backhaul link load status.

6. The method as in claim 1, wherein the localization policy information received from the policy control function entity further comprises information whether the second packet data connection is to be localized in the core network or in the radio access network and that this information is sent in the request to the mobile management function entity.

7. A first packet gateway node for controlling packet data connections in a mobile network comprising a core network and at least one radio access network, the first packet gateway node is comprising a processor coupled to a non-transitory memory storing computer program instructions wherein when the processor executes the instructions, the first packet gateway node is caused to:
   obtain data traffic information for a first packet data connection between a first peer and a second peer each located in a radio access network from the at least one radio access network where said first packet data connection is passing through the first packet gateway node;
   if determined from the data traffic information that the first packet data connection is carrying peer-to-peer traffic, send a request for localization policy information to a policy control function entity wherein the request comprises the obtained data traffic information and information about the first and the second peer;
   receive from the policy control function entity the requested localization policy information; and
   if according to the received localization policy information traffic localization is permitted, send a request to a mobile management function entity to move the data traffic from the first packet data connection to a second packet data connection passing through a second packet gateway node.

8. The first packet gateway node as in claim 7 further configured to obtain the data traffic information by performing deep packet inspection (DPI).

9. The first packet gateway node as in claim 7 further configured to receive from the policy control function entity information whether the second packet data connection is to be localized in the core network or in the radio access network and to send this information in the request to the mobile management function entity.

10. A method for operating a mobile management function entity in a core network the method comprising:
    receiving from a first packet gateway node a request to move data traffic from a first packet data connection between a first and a second peer each located in a radio access network where the first packet data connection is passing through the first packet gateway node to a second packet data connection passing through a second packet gateway node;
    based on location information received in the request, selecting the second packet gateway node; and
    instructing the first and the second peer to establish the second packet data connection through the second packet gateway node.

11. The method as in claim 10, wherein the request received from the first packet gateway node comprises information indicating if the second packet gateway node is to be selected from the core network or from the radio access network and that the second packet gateway node is selected from the indicated network.

12. A mobile management function entity (MME) for controlling packet data connections in a mobile network comprising a core network and at least one radio access network, the mobile management function entity is comprising a processor coupled to a non-transitory memory storing computer program instructions wherein when the processor executes the instructions, the mobile management function entity is caused to:
    receive from a first packet gateway node a request to move data traffic from a first packet data connection between a first and a second peer each located in a radio access network from the at least one radio access network where the first packet data connection is passing through the first packet gateway node to a second packet data connection passing through a second packet gateway node;
    based on location information received in the request, select the second packet gateway node; and
    instruct the first and the second peer to establish the second packet data connection through the second packet gateway node.

13. The mobile management function entity as in claim 12 further configured to receive in the request from the first packet gateway node information indicating if the second packet gateway node is to be selected from the core network or from the radio access network and to select the second packet gateway node from the indicated network.

14. A non-transitory machine-readable storage medium having instructions stored therein, which when executed by a processor of a first packet gateway node, causes the processor to perform operations comprising:
    obtaining data traffic information for a first packet data connection between a first peer and a second peer each located in a radio access network where the first packet data connection is passing through the first packet gateway node;
    if determined from the data traffic information that the first packet data connection is carrying peer-to-peer traffic, sending a request for localization policy information to a policy control function entity wherein the request comprises the obtained data traffic information and information about the first and the second peer;
    receiving from the policy control function entity the requested localization policy information; and
    if, according to the received localization policy information, traffic localization is permitted, sending a request to a mobile management function entity to move the data traffic from the first packet data connection to a second packet data connection passing through a second packet gateway node.

15. The non-transitory machine-readable storage medium of claim 14, wherein obtaining the data traffic information is performed by deep packet inspection, DPI.

16. The non-transitory machine-readable storage medium of claim 14, wherein the information about the first and the second peer comprises any or a combination of:
location information for the peers,
mobility information for the peers, and
user equipment identity.

17. The non-transitory machine-readable storage medium of claim 14, wherein the request for localization policy information further comprises information about a core network element load status or a backhaul link load status.

18. The non-transitory machine-readable storage medium of claim 14, wherein the localization policy information received from the policy control function entity further comprises information whether the second packet data connection is to be localized in the core network or in the radio access network and that this information is sent in the request to the mobile management function entity.

19. A non-transitory machine-readable storage medium having instructions stored therein, which when executed by a processor of a mobile management function entity, causes the processor to perform operations comprising:
receiving from a first packet gateway node a request to move data traffic from a first packet data connection between a first and a second peer each located in a radio access network where the first packet data connection is passing through the first packet gateway node to a second packet data connection passing through a second packet gateway node;
based on location information received in the request, selecting the second packet gateway node; and
instructing the first and the second peer to establish the second packet data connection through the second packet gateway node.

20. The non-transitory machine-readable storage medium of claim 19, wherein the request received from the first packet gateway node comprises information indicating if the second packet gateway node is to be selected from the core network or from the radio access network and that the second packet gateway node is selected from the indicated network.

* * * * *